United States Patent [19]

Dorsch et al.

[11] 4,431,435
[45] Feb. 14, 1984

[54] SCRUBBER APPARATUS INCLUDING IMPROVED SPRAY APPARATUS FOR FLUID DISPERSION

[75] Inventors: Robert Dorsch, Warren; Arnold J. Matusz, West Bloomfield, both of Mich.

[73] Assignee: Alpha-Debon Industries, Inc., Madison Heights, Mich.

[21] Appl. No.: 389,924

[22] Filed: Jun. 18, 1982

[51] Int. Cl.³ .................. B01D 47/06; F23J 11/00
[52] U.S. Cl. .............................. 55/241; 55/242; 55/422; 55/DIG. 46; 261/111; 98/115 SB; 118/DIG. 7
[58] Field of Search ............... 55/231, 240, 241, 242, 55/422, DIG. 46; 98/115 SB; 118/326, DIG. 7; 261/111

[56] References Cited

U.S. PATENT DOCUMENTS

| | | | |
|---|---|---|---|
| 2,243,839 | 6/1941 | Dalton | 55/241 |
| 2,337,983 | 12/1943 | Fisher | 55/DIG. 46 |
| 2,385,077 | 9/1945 | Harker et al. | 55/241 |
| 3,018,847 | 1/1962 | Stanly | 55/241 |
| 3,075,751 | 1/1963 | Najarian | 261/112 |
| 3,119,675 | 1/1964 | Gallagher | 55/257 |
| 3,123,455 | 3/1964 | Paasche | 55/228 |
| 3,138,087 | 6/1964 | Larsson et al. | 98/115 SB |
| 3,168,030 | 2/1965 | Wilhelmsson et al. | 98/115 SB |
| 3,182,977 | 5/1965 | Erni | 261/112 |
| 3,738,627 | 6/1973 | Scotchmur | 261/119 R |
| 3,782,080 | 1/1974 | Gallagher | 55/226 |
| 3,932,151 | 1/1976 | Lau | 55/229 |
| 3,934,495 | 1/1976 | Bloomer | 98/115 SB |
| 4,085,896 | 4/1978 | Dorsch et al. | 239/504 |
| 4,227,895 | 10/1980 | Boon | 55/241 |

FOREIGN PATENT DOCUMENTS

| | | | |
|---|---|---|---|
| 35905 | 9/1981 | European Pat. Off. | 98/115 SB |
| 1315491 | 5/1973 | United Kingdom | 118/326 |
| 628379 | 8/1978 | U.S.S.R. | 55/422 |

*Primary Examiner*—David L. Lacey
*Attorney, Agent, or Firm*—Harness, Dickey & Pierce

[57] ABSTRACT

The disclosure relates to a new apparatus for fluid dispersion for use in removing particulate matter from air. A spray head or other fluid spray-producing means comprises a rigid spray plate bent to a predetermined configuration with two spray head side plates attached to said spray plate, and two spray head side guide bars attached to said side plates. A pressurized fluid, such as water, is delivered at the bottom of the spray plate whereupon impact with the surfaces of the spray plate, side plates and guide bars causes the fluid to be dispersed in spray form. Through this spray is passed contaminated air containing undesirable particulate matter such as paint overspray, whereupon the air is scrubbed to remove substantially all of the particulate matter. Such a spray head apparatus is typically located at the base of a scrubbing unit connected to a paint spray booth or the like, said scrubbing unit containing baffles through which contaminated air is passed and cleaned prior to emitting the remaining particle-free air to the atmosphere. A diverter apparatus diverts a portion of the fluid spray and directs it toward one or more surfaces of said scrubbing unit to preclude accumulation of the particles thereon.

6 Claims, 5 Drawing Figures

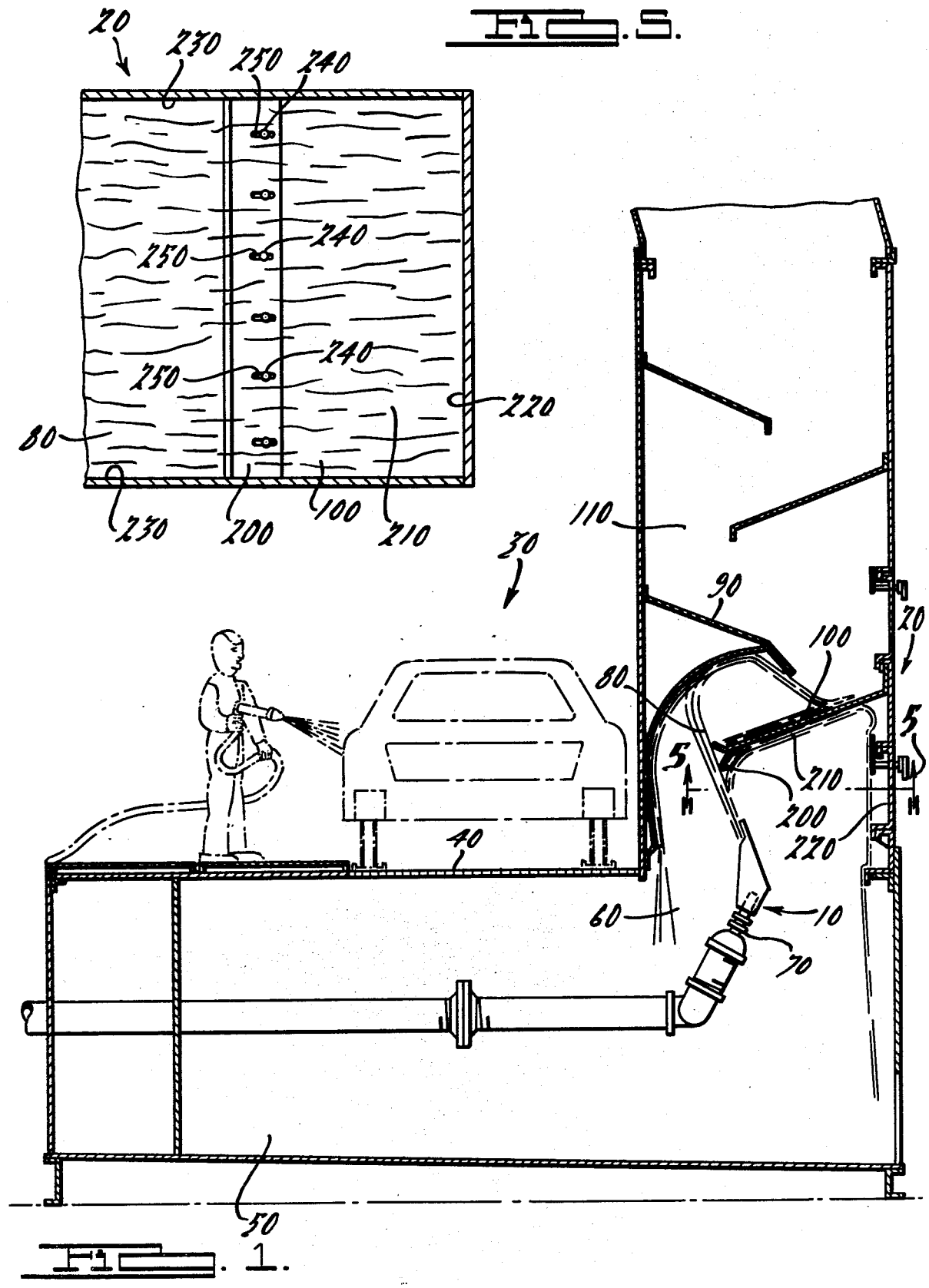

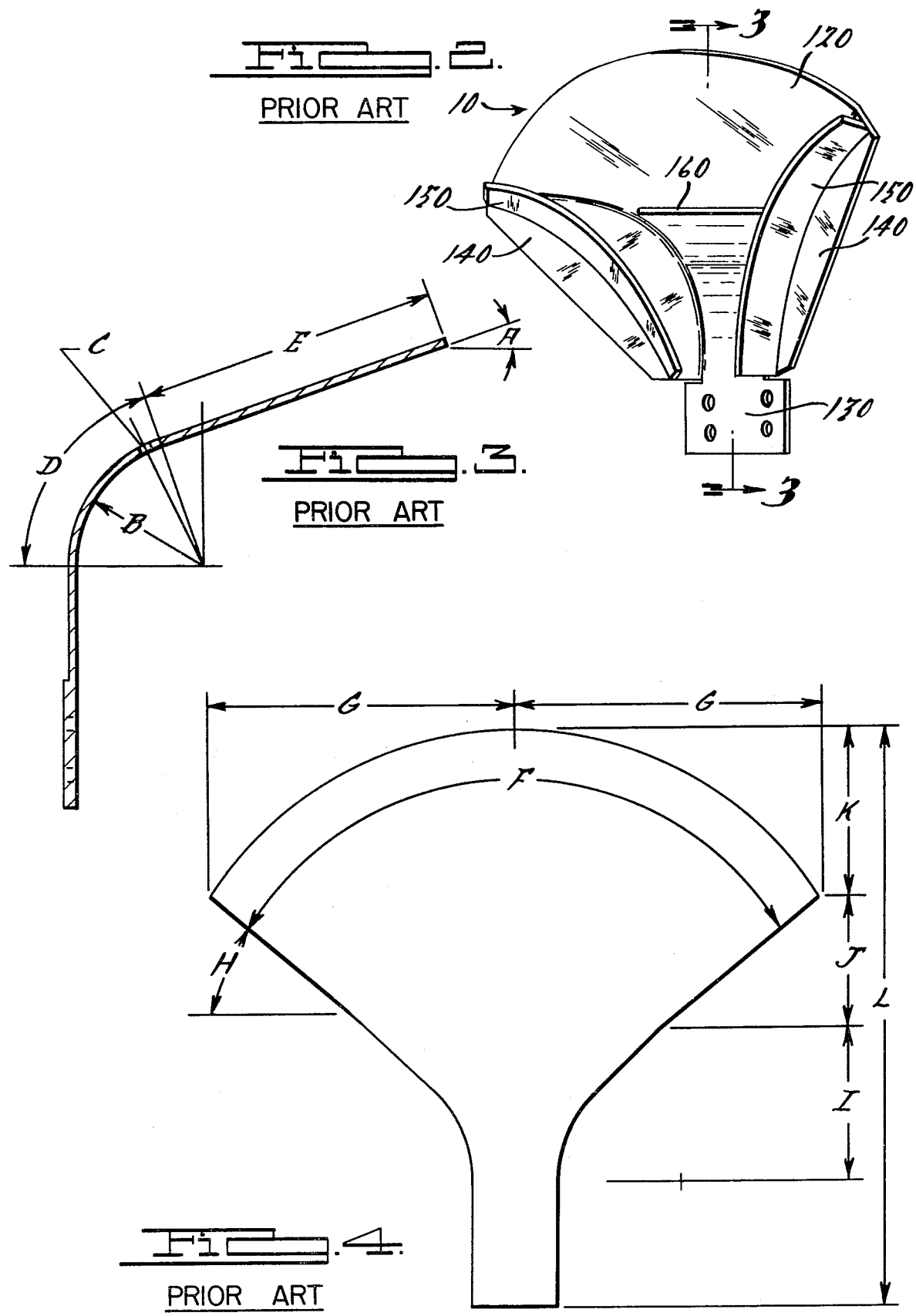

SCRUBBER APPARATUS INCLUDING IMPROVED SPRAY APPARATUS FOR FLUID DISPERSION

BACKGROUND AND SUMMARY OF THE INVENTION

The present invention pertains primarily to spray apparatus for fluid dispersion, and more particularly to spray apparatus for use in removing particulate matter from air.

Generally, spray nozzles for use in fluid dispersion include projecting openings or vents that direct the flow of fluid from a confined container or conduit into an open space. As an example, some nozzles such as those found in an impulse turbine, disperse the fluid in a jet. Other nozzles such as a cone nozzle for use in the combustion chamber of a furnace disperse the fluid in an atomized mist. The nozzle that may typically be attached to a fire hose or garden hose disperses fluid in spray form, with the spray being of specific shape and volume.

Most conventional spray nozzles have been found to be unsatisfactory for removing undesirable particles from contaminated air and virtually none are able to remove substantially all of the particulate matter. Furthermore, such conventional spray nozzles are typically not capable of preventing the particulate matter from collecting on various surfaces of an associated apparatus. The collection of such particulate matter has proven to be a perennial problem in such apparatus and is especially troublesome in areas generally behind or below the spray nozzle, thus unduly increasing the maintenance burden in such areas.

In U.S. Pat. No. 4,085,896, issued to Dorsch et al on Apr. 25, 1978, the disclosure of which is incorporated herein, an apparatus and spray head for fluid dispersion is disclosed which is capable of removing substantially all undesirable particulate matter from contaminated air. The spray head comprises a metal spray plate bent to a predetermined configuration with two side plates attached to said spray plate, and two spray side guide bars attached to said side plates. When pressurized fluid, such as water, is delivered at the bottom of the spray plate and impacted with the surfaces of the spray plate, side plates and guide bars, a spray is formed which scrubs the contaminated air passing generally in front of the spray head. As a result, substantially all particulate matter may be removed from contaminated air introduced into a chamber or conduit in which the spray head is located, and clean air, which may be exhausted to the atmosphere, is discharged from the chamber. Although the spray head described in the above-mentioned patent is extremely effective in removing particulate matter from the exhaust air, some of such particulate matter may accumulate or collect on interior surfaces of the chamber or conduit in areas that are generally behind or below the spray head or generally out of the path of the spray.

In accordance with the present invention, a diverter apparatus is included in the chamber or conduit and directs a portion of the fluid spray toward the above-mentioned interior surfaces to substantially prevent the accumulation of particulate matter thereon. The diverter apparatus preferably comprises a curved vane member that cooperates with the spray head to cause the diverted portion of the fluid spray to flow along said interior surfaces. The diverted portion of the fluid spray forms a "fluid barrier" that has proven to be surprisingly effective in virtually eliminating the accumulation of particulate matter on such surfaces. Adjustment means are provided for selectively varying the position of the diverter apparatus relative to the spray head.

BRIEF DESCRIPTION OF THE DRAWINGS

FIG. 1 is a cross-sectional view of a preferred embodiment of the present invention as shown in use in a scrubbing unit connected to an automotive paint spray booth.

FIG. 2 is a perspective view of a preferred embodiment of a spray head employed in connection with the present invention.

FIG. 3 is a side view of the preferred spray head taken generally along line 3—3 of FIG. 2.

FIG. 4 is a stretch-out view of the spray plate portion only of the preferred spray head.

FIG. 5 is a view taken along line 5—5 of FIG. 1.

DETAILED DESCRIPTION OF THE PREFERRED EMBODIMENT

FIGS. 1 through 5 of the drawings depict a preferred spray apparatus of the present invention for purposes of illustration only. One skilled in the art will readily recognize, however, that the principles of the present invention are equally applicable to spray apparatus other than that shown in the drawings.

FIG. 1 illustrates a spray head 10 in use in a scrubbing unit 20, which is connected to a paint spray booth 30. In an automobile assembly plant, for example contaminated air containing paint overspray is drawn by suction force through a grating structure 40 and a water trough 50, and into the base section 60 of scrubbing unit 20. Water or other fluids flowing through a pipe 70 at about 8 pounds per square inch pressure and about 175 gallons per minute flow rate, for example, impacts the spray head 10 causing a water spray 80. The scrubbing unit 20 acts as a conduit or chamber for passing contaminated air through the water spray 80. This water spray 80 scrubs the contaminated air, removing most of the paint overspray particles in the mixing region between curved baffles 90 and straight baffles 100. Any particles not removed in that step, proceed up the scrubbing unit to the upper section 110 where they are removed by water mist and the action of a number of upper baffles. It has been found that the spray head 10 removes substantially all undesirable particulate matter such as paint overspray with an efficiency of about 99%. The remaining particle-free air proceeds from the scrubbing unit through exhaust vents to the atmosphere. In a typical automobile assembly plant, several of such scrubbing units may be used side by side in a parallel flow arrangement.

FIG. 2 shows a perspective view of the spray head 10, which in a preferred embodiment is preferably made of steel sheet stock, with pieces welded thereto. The spray head 10 is comprised of a spray plate 120 which is bent at a predetermined radius to form an obtuse angle. The spray plate 120 flares out beyond the bent portion. A spray head clamp plate 130 is attached to the spray plate 120 and serves as a mounting plate for the spray head 10. Two spray head side plates 140 are attached to either side of the spray plate 120, and a side guide bar 150 is welded at right angles to each of the side plates 140. In this preferred embodiment of the present invention, the spray plate 120 contains a spray head slot 160 which functions to divert some water spray to the back side of the spray head 10, thus scrubbing any contaminated air which finds its way behind the spray head 10. The spray head clamp plate 130 and the two side guide bars 150 are made of thicker sheet metal stock in this embodiment to furnish extra rigidity.

FIG. 3 shows a side view of a preferred embodiment of the present invention through section 3—3. FIG. 4 is a stretch-out view of the spray plate portion only of the same preferred embodiment. Both of these figures contain letters which correspond to the possible preferred dimensions listed in Table 1. The variables listed in Table 1 are examples of dimensional relationships which have proved successful in operation.

TABLE 1

| Variable | Description |
| --- | --- |
| A | From 5° to 65°, varies with "D" |
| B | From 2 inches to 6 inches |
| C | From ⅛ inch to ¾ inch |
| D | From 85° to 25° |
| E | From 4 inches to 12 inches |
| F | From 60° to 120° |
| G | Varies with "F" |
| H | Varies with "F" |
| I | Varies with "B" and "D" |
| J | Varies with "F" |
| K | Varies with "F" |
| L | Varies with "F", and "B", and "D" |

Variables B, D, and F are the most critical. The total angle formed by the spray plate is variable A plus 90°.

It should be noted that the dimensions of the head side plates and spray side guide bars vary with the dimensions of the spray plate and are adapted for mating thereto. None of the dimensions shown above should be deemed to be limiting and are only suggestions of possible dimensional relationships which have been shown to provide an effective way of practicing this invention.

It has been found that the use of the preferred embodiment described in the preceding paragraphs is capable of removing substantially all undesirable particulate matter such as paint overspray from contaminated air. Tests made on the air exiting the upper portion of a scrubbing unit attached to a paint spray booth in an automobile assembly plant have indicated that over 99% of the airborne paint overspray particles can be removed. With the increased attention being given to air quality and environmental standards in recent years, such performance is now a requirement, or at least a goal, of most manufacturers faced with particle contamination of air emissions.

As shown in FIGS. 1 and 5, the scrubbing unit 20 includes a diverter apparatus in which curved vane member 200 is attached to, and protrudes from, the straight baffle 100. The curved vane member 200 diverts a portion 210 of the water spray 80 and directs it toward the back wall 220 and the side walls 230 of the scrubbing unit 20.

The curved vane member 200 cooperates with the diverging water spray 80 to cause the diverted portion 210 to diverge in a direction away from the spray head 10. The diverted portion 210 thus flows along the lower surface of the straight baffle 100 and also along the back and side walls 220 and 230, respectively. The diverted portion 210 therefore effectively forms a water curtain or water barrier along the lower surface of the straight baffle and the back and side walls to prevent paint particles from collecting or accumulating thereon.

As shown in FIG. 5, the curved vane member 200 is preferably attached to the straight baffle 100 by fasteners 240 extending through elongated openings 250. Such an attachment allows the position of the curve vane member 200 relative to the spray head 10 to be selectively adjusted to selectively vary the quantity or direction of the diverted portion 210 as desired to achieve an optimum combination of air scrubbing and scrubber surface cleaning.

The foregoing discussion and the accompanying drawings describe and illustrate merely exemplary, preferred embodiments of the present invention. One skilled in the art will readily recognize, however, that the invention is susceptible to modification, variation and change without departing from the proper scope or fair meaning of the following claims.

What is claimed is:

1. An apparatus for removing particulate matter from contaminated air, said apparatus having means for producing a fluid spray, conduit means for passing said contaminated air through said fluid spray, wherein the improvement comprises diverter means for diverting a portion of said fluid spray and for directing said diverted portion of said fluid spray toward a predetermined surface of said conduit means to prevent accumulation of said particulate matter on said conduit surface, said apparatus further including baffle means for mixing said contaminated air with said fluid spray, said baffle means including a baffle member protruding from said conduit surface, said diverter means including a vane member attached to said baffle member, said vane member being curved generally toward said fluid spray means so that at least some of said diverted portion also flows along at least a portion of said surface of said conduit and said baffle member.

2. An apparatus according to claim 1, wherein said fluid spray means includes means for directing said fluid spray in a pattern that diverges in a direction away from said fluid spray means, said diverted portion thereby further diverging in a direction toward said conduit surface when said fluid spray contacts said curved vane member.

3. An apparatus according to claim 2, further comprising means for selectively adjusting the position of said vane member relative to said spray head, thereby selectively adjusting the quantity and direction of said diverted portion of said fluid spray.

4. In an apparatus for removing particulate matter from air wherein contaminated air containing undesirable particulate matter is passed through a chamber containing a fluid spray whereupon said air is scrubbed to remove substantially all of the undesirable particulate matter, said fluid spray being produced upon the impact of pressurized fluid with the surface of a spray head having a rigid bent spray plate with two rigid head side plates attached thereto, and two rigid spray side guide bars attached to each of said side plates, said spray plate being bent in a radius of from about 2 inches to about 6 inches to form an angle of between about 95 degrees to about 155 degrees, and wherein said spray plate flares out beyond the bent portion extending through an angle of between about 60 degrees to about 120 degrees, wherein the improvement comprising diverter means for diverting a portion of said fluid spray in a diverging pattern toward at least one interior surface of said chamber located generally out of the path of said fluid spray, thereby preventing the accumulation of said particulate matter on said at least one interior chamber surface, said apparatus including baffle means for mixing said contaminated air with said fluid spray, said baffle means including a baffle member protruding from said at least one chamber surface, said diverter means including a vane member attached to said baffle member, said vane member being curved generally toward said spray head so that at least some of said diverted portion also flows along at least a portion of said at least one chamber surface and said baffle member.

5. An apparatus according to claim 4, wherein said chamber is generally rectangular in cross-section, said chamber having a back wall and a pair of side walls, said baffle member being secured to said back wall and to a portion of each of said side walls, said curved vane member protruding from a front portion of said baffle member and extending between said side walls, said curved vane member cooperating with said spray head so that said diverted portion of said fluid spray flows along at least a portion of said back and side walls.

6. An apparatus according to claim 5, further comprising means for selectively adjusting the position of said vane member relative to said spray head, thereby allowing for selective adjustment of the quantity and direction of said diverted portion of said fluid spray.

* * * * *